US012735853B2

(12) United States Patent
Laugen et al.

(10) Patent No.: US 12,735,853 B2
(45) Date of Patent: Sep. 15, 2026

(54) ICE SCRATCHER

(71) Applicant: Polaris Industries Inc., Medina, MN (US)

(72) Inventors: Jesse Laugen, Roseau, MN (US); Joshua Mickelson, Roseau, MN (US); Jeremy Allen Hughes, Roseau, MN (US); Jeffrey Nels Johnson, Warroad, MN (US); Austin Adair Mortenson Holt, St. Anthony, MN (US); Joseph Patrick Wood, Forest Lake, MN (US); Jeremy Eichenberger, Warroad, MN (US)

(73) Assignee: Polaris Industries Inc., Medina, MN (US)

( * ) Notice: Subject to any disclaimer, the term of this patent is extended or adjusted under 35 U.S.C. 154(b) by 591 days.

(21) Appl. No.: 18/365,308

(22) Filed: Aug. 4, 2023

(65) Prior Publication Data

US 2024/0043076 A1 Feb. 8, 2024

Related U.S. Application Data

(60) Provisional application No. 63/395,559, filed on Aug. 5, 2022.

(51) Int. Cl.
*E01H 5/12* (2006.01)
*B62D 55/092* (2006.01)
*B62M 27/02* (2006.01)

(52) U.S. Cl.
CPC ............ *E01H 5/12* (2013.01); *B62D 55/092* (2013.01); *B62M 27/02* (2013.01)

(58) Field of Classification Search
CPC ................................ E01H 5/12; Y10S 280/90
See application file for complete search history.

(56) References Cited

U.S. PATENT DOCUMENTS 4,076,089 A 2/1978 Sanders
5,277,266 A * 1/1994 Robinson ............ B62D 55/092 305/117

(Continued)

FOREIGN PATENT DOCUMENTS

CA 2736938 A1 * 10/2012 ............. B62J 31/00
CA 2858170 A1 * 1/2015

*Primary Examiner* — Kevin Hurley
(74) *Attorney, Agent, or Firm* — Merchant & Gould P.C.

(57) ABSTRACT

A snowmobile ice scratcher has a wire form in the shape of a hook secured to a track frame of the snowmobile. The wire form has a coil portion at the track frame and a downwardly extending leg portion that in an undeflected position has an elongate snow/ice spray generating portion configured as a flattened wire segment portion oriented downwardly, forwardly, and inwardly for generating snow/ice spray on hard packed snow and/or ice surfaces. An upwardly facing flat surface of the elongate snow/ice spray generating portion faces upwardly, inwardly, and forwardly and creates an ice/snow spray as the snowmobile is moving forward that is primarily directed inwardly to provide improved lubrication of the track assembly and improved deposition of ice/snow spray under the tunnel on a heat exchanger, thereby providing improved cooling of the snowmobile engine. The hook shape of the leg portion allows rearward operation of the snowmobile without damage to the ice scratcher.

20 Claims, 14 Drawing Sheets

(56) References Cited

U.S. PATENT DOCUMENTS

| | | | | |
|---|---|---|---|---|
| 7,559,576 | B1 | 7/2009 | Honkala et al. | |
| 7,918,298 | B2 * | 4/2011 | Cook | F01P 9/00 37/219 |
| 8,646,559 | B2 * | 2/2014 | Beaudoin | B62M 27/02 37/219 |
| 9,038,758 | B2 * | 5/2015 | Vezina | B62M 27/02 37/219 |
| 9,610,987 | B2 | 4/2017 | Bedard | |
| 9,796,437 | B2 | 10/2017 | Wilson | |
| 9,845,004 | B2 | 12/2017 | Hedlund et al. | |
| 10,549,817 | B2 * | 2/2020 | Bernier | B62M 27/02 |
| 2018/0334211 | A1 | 11/2018 | Mertens et al. | |
| 2025/0074519 | A1 * | 3/2025 | Marineau | B62J 31/00 |

* cited by examiner

200

206
200
208
206

210
200
200

206

ICE SCRATCHER

CROSS-REFERENCE TO RELATED APPLICATIONS

This application claims the benefit of U.S. Provisional Application No. 63/395,559, filed Aug. 5, 2022, the entire contents of which are incorporated by reference herein.

BACKGROUND OF THE INVENTION

Snowmobiles are operated in wide ranging snow conditions and weather conditions. High performance snowmobiles are typically water cooled and generally have heat exchangers mounted within the snowmobile tunnel below the seat to directly receive snow thrown by the track as the snowmobile is operated. Additionally, snow provides lubrication between the track and slide rails.

Such water cooled snowmobiles may have performance problems due to overheating when operated on hard packed snow or on ice where soft snow is not present and is not thrown by the track providing the engine cooling. Additionally, track lubrication functions may also be impaired causing issues such as reduction in the life of the track and increased power demands to drive the track. So called ice scratchers mounted on the sides of snowmobiles are known for scratching the ice or hard pack snow in such conditions to produce a spray of ice or snow that can enter the tunnel and internal region of the track providing lubrication for the track and for cooling heat exchanger(s) mounted under the snowmobile seat. Such scratchers may be configured as a wire spring, a metal cable, or have other configurations. All such configurations have the intended function of disrupting the snow or ice so that the snow or ice spray enters the track region and/or contacts the heat exchanger(s). Typically, the ice scratchers have a deployed position and a stowed position for when the ice scratchers are not needed.

SUMMARY OF THE INVENTION

Known wire ice scratchers have a coil portion that is mounted to the outwardly facing frame that supports the snowmobile track and then have a downwardly directed non-coiled portion that engages the ice and/or snow. When viewed from the side of the snowmobile, the ice scratchers are typically directed directly downwardly or downwardly and rearwardly. When viewed from the front end or rear end of the snowmobile, such wire ice scratchers extend downwardly and outwardly from the snowmobile and typically simply scratch the top surface of the hardpack snow and/or ice. Such conventional ice scratchers generate a "cloud" of ice/snow spray that is evenly dispersed about the wire tip snow interface, a portion of which enters the snowmobile track and tunnel as the snowmobile travels forwardly.

Many such conventional spring wire ice scratchers may be damaged when the snowmobile is put in reverse, causing yielding of the wire form, that is, non-resilient deformation, and then diminished effectiveness in spraying snow/ice when the snowmobile is operated in a forward direction.

In embodiments, a wire form extends from coil mounted on the track frame of a snowmobile, a leg portion extends outwardly and downwardly, then having a flattened end portion of the wire form that extends downwardly, forwardly and inwardly. A flat surface on the flattened end portion faces upwardly, forwardly, and inwardly. A feature and advantage is the configuration provides a hook shape that provided an enhanced disruption of the snow/ice generating a cloud of ice snow that is directed more inwardly toward the snowmobile, that has greater volume, and that has greater height that conventional ice scratchers. This dramatically increases the amount of spray impacting the heat exchanger in the snowmobile tunnel and provides better lubrication for the snowmobile track. Moreover, the configuration also resists any permanent deformation both as the snowmobile travels forwardly and when operated in reverse.

In embodiments, the configuration of the leg portion defines a hook with a first hook portion that extends downwardly outwardly, transitions to a second hook portion that extends downwardly and rearwardly, and then transitions to a third and leading forward hook end portion with a hook point that extends forwardly, inwardly, and downwardly. The three hook portions defining the completed hook shape with the hook point that is pointed forwardly, inwardly, and downwardly for enhanced disruption of the hard packed snow and/or ice. In combination with the resilient coiled spring portion unitary with the hook, the ice scratcher has improved structural strength to aggressively dig into hard pack snow and/or ice without permanent deformation and to provide an increased quantity of spray of ice/snow, compared to conventional ice scratchers. Moreover, the increased quantity of spray has a directional control and is focused more upwardly and more inwardly as opposed to conventional ice scratchers.

A feature and advantage of embodiments is that the forward and downward angulation of the hook end portion and hook point effectuates more of a digging and fracturing action as compared to the dragging and scrapping action of most conventional ice scratchers. The forward, inward, and downward angulation of the hook end portion and hook tip effectuates an inward launching of the snow/ice that is dug up and fractured. In embodiments, the flattened top of the hook end portion is believed to provide a further increase in the volume of the snow/ice dug up and fractured as well as providing an enhanced upward and inward launching action.

The inventors have discovered that when the distal segment portion of the leg portion of known ice scratchers that extends outwardly and downwardly and forwardly, the ice/snow spray is in an approximate rearward cone, with respect to the forward traveling snowmobile, that has an axis that is generally directly rearwardly or even slightly outwardly. This compares to a cone generated with respect to embodiments described herein where the forward traveling snowmobile having forward, inward, and downward angulation of the distal segment portion, wherein the cone has an axis angled inwardly and at a greater angle upwardly providing more efficient delivery of snow/ice under the tunnel.

A feature and advantage of embodiments is that the proximal segment portion of the leg portion of the ice scratcher connecting to the spring portion at a forward and lower juncture of the spring portion, allows the tip of the leg portion, as it digs into the ice/snow, and the leg portion deflects rearwardly approximately about the axis of the coil, the tip tends to maintain an approximate constant depth in the ice/snow, or even slightly retracts as the tip end is forced rearwardly. This is believed to provide, as contrasted to an arrangement where the leg portion extends directly downward and where the tip is positioned forwardly of the juncture between the downwardly extending leg and coil, a more consistent disruption of the surface of the ice/snow and accordingly a more consistent spray of consistently more volume.

A feature and advantage of embodiments is that the inward distal leg segment portion extends inwardly toward the snowmobile track and frame, this positions the mid leg portion segment outside of the spray region created by the tip of the leg portion of the ice scratcher, in other words, the mid leg portion does not inhibit the snow ice spray directed upwardly and inwardly toward the snowmobile. This contrasts with a distal leg segment portion that is angled outwardly where the mid leg portion may inhibit a portion of the snow ice spray.

A feature and advantage of embodiments is that the inventors have surprisingly discovered that there is an observable greater cooling functionality with the inward forward downward orientation of the distal leg segment as described herein compared to the conventional arrangements such as where the distal leg segment is oriented outwardly, rearwardly, and downwardly; or where the distal leg segment is oriented forwardly and outwardly; or where the distal leg segment is oriented downwardly and directly forward.

A feature and advantage of embodiments is a spring action where the flattened surface of the paddle shaped end portion of the wire form launches snow/ice in a directed manner inwardly, upwardly, and to a limited extent forwardly. As the snowmobile is traveling forward, this launching is projected inwardly and upwardly and into the internal track region and the snowmobile tunnel where the heat exchanger for the snowmobile engine is located.

A feature and advantage of embodiments, it that the distal end portion and tip of the leg portion extending at an angle inwardly and forwardly when viewed from above, and angled downwardly and forwardly when viewed from the side, deflects the sprayed ice/snow upwardly and inwardly more so than conventional ice scratchers where the distal end portion and tip are directed downwardly and forwardly, when viewed from the side, and parallel and to the direction of travel and forwardly, when viewed from above. This forward-downward-inward distal end portion orientation also generates significantly greater ice/snow spray than when the distal end portion is directed forward-downward-outward.

The leg portion of the ice scratcher, when viewed from the side is upright with a slight rearward angulation from the coiled spring downwardly, in embodiments, the angulation from a vertical line, perpendicular to the lower horizontal track frame, being from 3° to 20°. A feature and advantage of such embodiments is that the snowmobile can be operated in reverse without damage to the ice scratcher. The leg portion may be manually rotated rearwardly to move the ice scratcher to a stowed position along the track frame, hooking on the frame itself or a separate fixture attached to the frame.

A feature and advantage of embodiments is an ice scratcher with a wire form having a leg portion wherein the entirety of the leg portion extends rearwardly except the distal leg segment portion that extends forwardly and is flattened and is angled slightly inwardly toward the snowmobile provides a form that resists permanent deformation when the snowmobile is operated in reverse.

A feature and advantage of embodiments is high performance snowmobiles may better maintain their high performance, compared to conventional ice scratchers, on hard packed snow and/or ice, where the snowmobile track does not generate enough dispersed snow for cooling the heat exchanger and lubricating the track mechanism.

DETAILED DESCRIPTION

Figure 1:
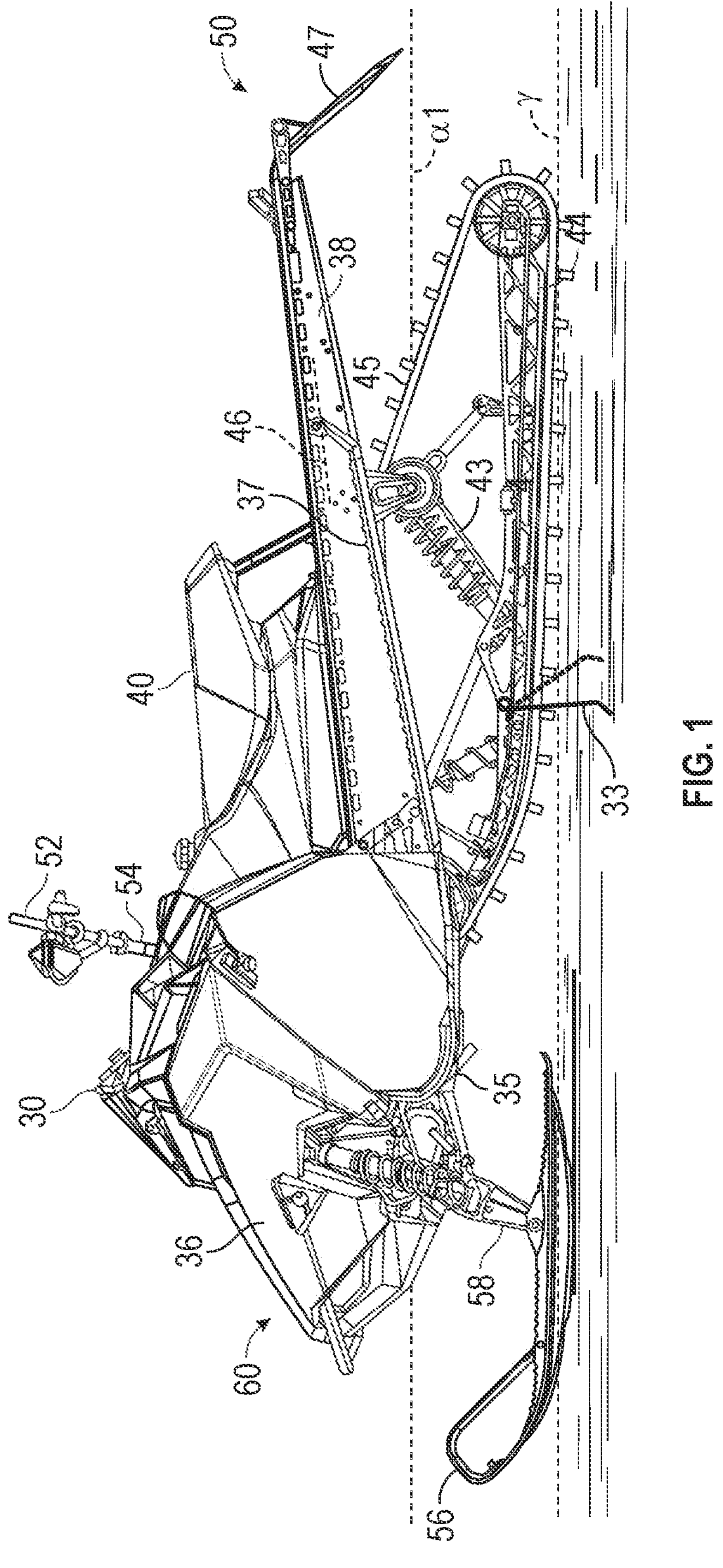
FIG. 1 is a side elevational view of a snowmobile with an ice scratcher in accord with embodiments.
Figures 2, 3:
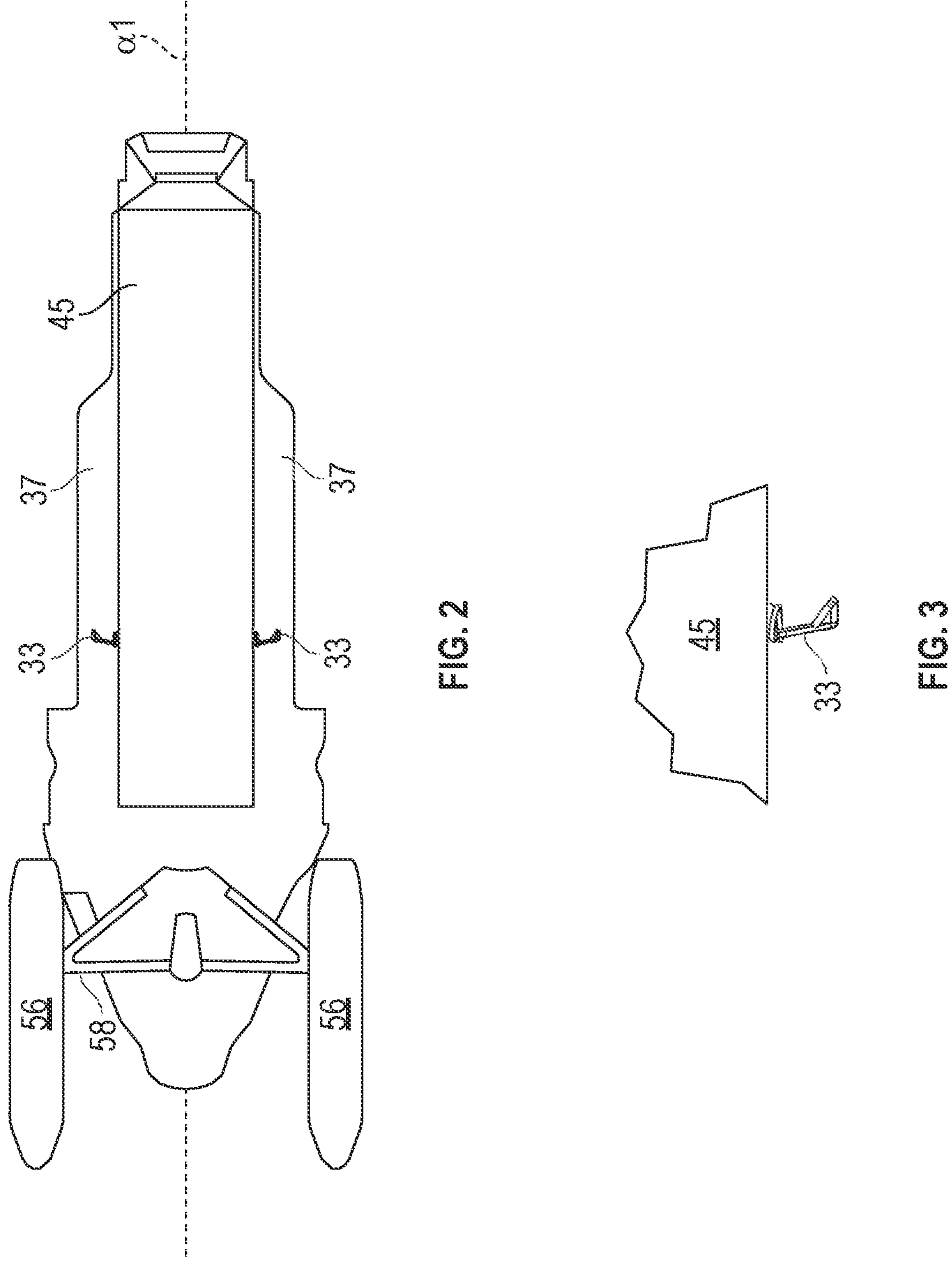
FIG. 2 is a bottom plan view of a depiction of a snowmobile with ice scratchers in accord with the invention.
FIG. 3 is an enlarged view of one of the ice scratchers of FIG. 2.
Figure 4:
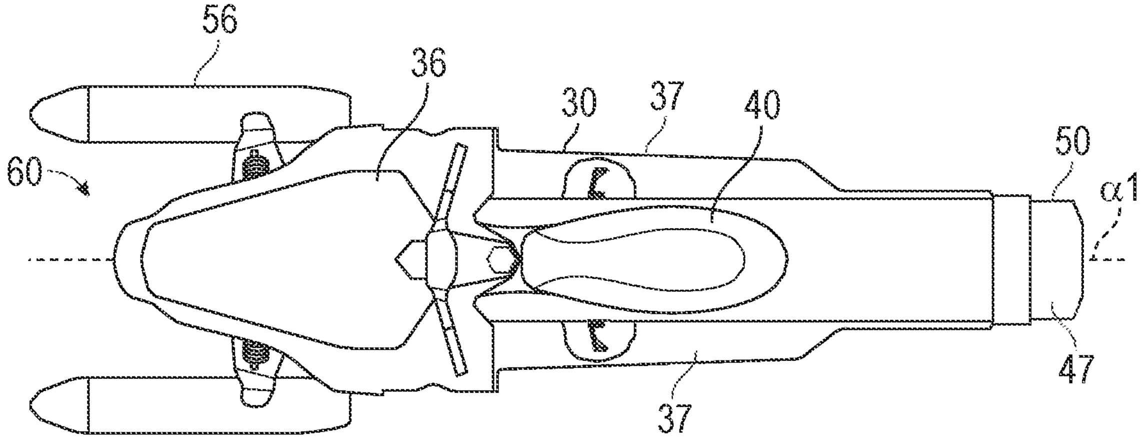
FIG. 4 is a top plan view of a snowmobile with portions of the running boards cut away to reveal the ice scratchers according to embodiments.

Referring to FIGS. 1-5, a snowmobile 30 with a pair of ice scratchers 33 attached is depicted. The snowmobile 30 generally has a forward-rearward axis $\alpha 1$ and generally rides upon a surface $\gamma$ that may be snow of various densities and/or ice that is parallel to the snowmobile axis $\alpha 1$. The snowmobile 30 has a frame 35 that generally supports a body 36, running boards 37, a tunnel 38, a seat 40 on the tunnel, and rear suspension 43 that connects to a track frame 44 with a track 45 thereon. The track and rear suspension are partially positioned within the tunnel. An engine, not shown, drives the track. A heat exchanger 46 for cooling the coolant of the engine may also be positioned in the tunnel, the heat exchanger 46, not visible from the side views, is depicted by the dashed lines in FIG. 1. A snow flap 47 is depicted on the end of the tunnel 38 at the rearward end 50 of the snowmobile.

Ice scratchers are typically provided for both the right side and left side of snowmobiles but some users may only utilize a left side or right side ice scratcher. Right and left as used herein are from the rider's perspective. The configurations of left and right side ice scratchers as described herein are essentially minor images of each other.

Steering handlebars 52 are part of the steering system 54 that directionally orient skis 56 supported by a forward suspension system 58, all positioned at the forward end 60 of the snowmobile 33. Further explanation and descriptions of such snowmobile components and other snowmobile components are found in U.S. Pat. Pub. US 2018/0334211 and U.S. Pat. No. 7,559,576 both owned by the owner of this application. Said patent and publication are incorporated by reference herein for all purposes.

The snowmobile track frame 44 and track 45 operate more efficiently with a supply of snow and/or ice being provided to the intermeshing and cooperating components. For example, snow and ice dramatically reduce the friction of the track riding on and interfacing with the track frame and rollers thereon. Additionally, the heat exchanger 46 in the tunnel and above the track, is significantly more effective when it is sprayed with snow and/or ice. When the snowmobile is riding on soft snow, the track picks up, throws, and adequately disperses snow both for lubricating the track 45 and track frame 44 as well as for cooling the heat exchanger 46. When the snowmobile 30 is riding on hardpack snow or ice, the ice scratcher 33, shown in a deployed and non-deflected position in FIGS. 1-5 in solid lines and a deflected position, such as when engaging ice, in dashed lines, generates and disperses the ice/snow spray about the track 45 and track frame 44 and onto the heat exchanger 46 more effectively and efficiently than conventional ice scratchers.

Figure 5:
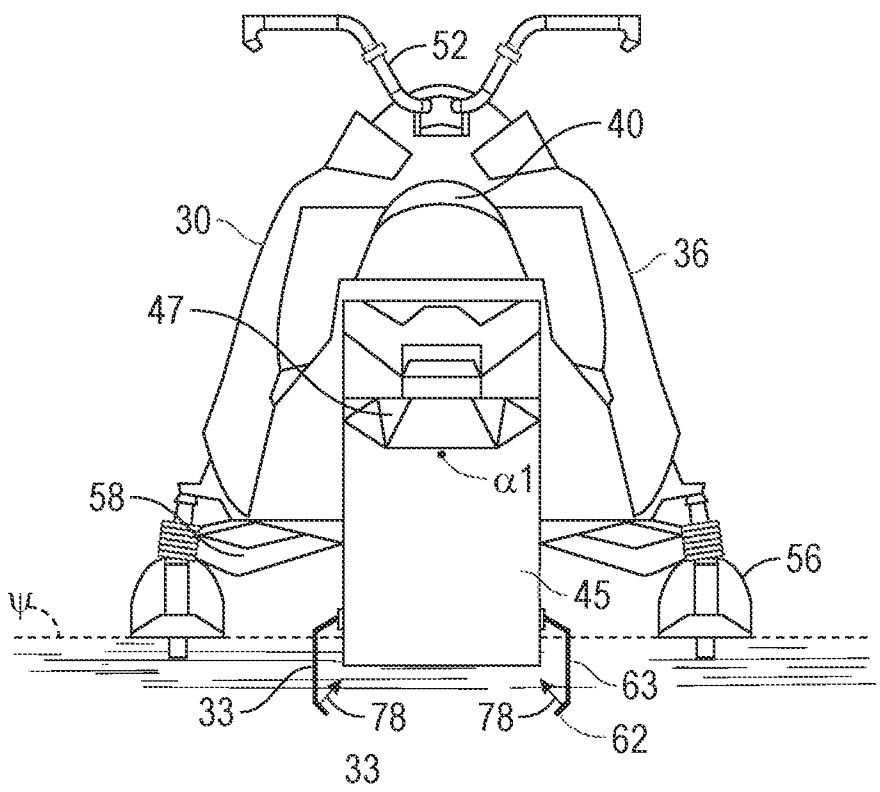
FIG. 5 is a rear elevational view of a snowmobile with ice scratchers according to embodiments.
Figures 6, 7:
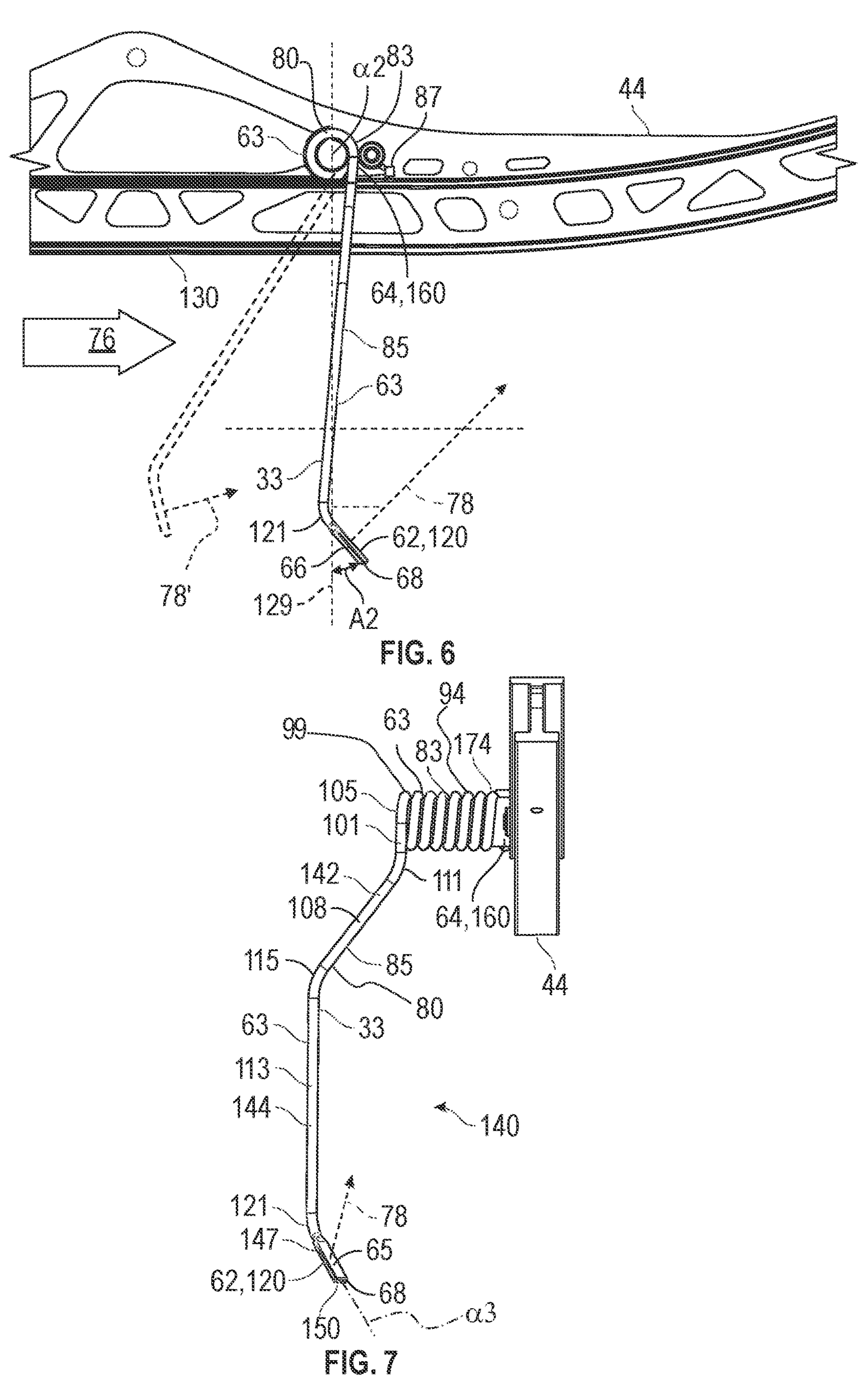
FIG. 6 is a detailed elevational view of a snowmobile track frame with an ice scratcher attached thereto.
FIG. 7 is a rear elevational view of the snowmobile track frame and ice scratcher of FIG. 6.
Figure 8:
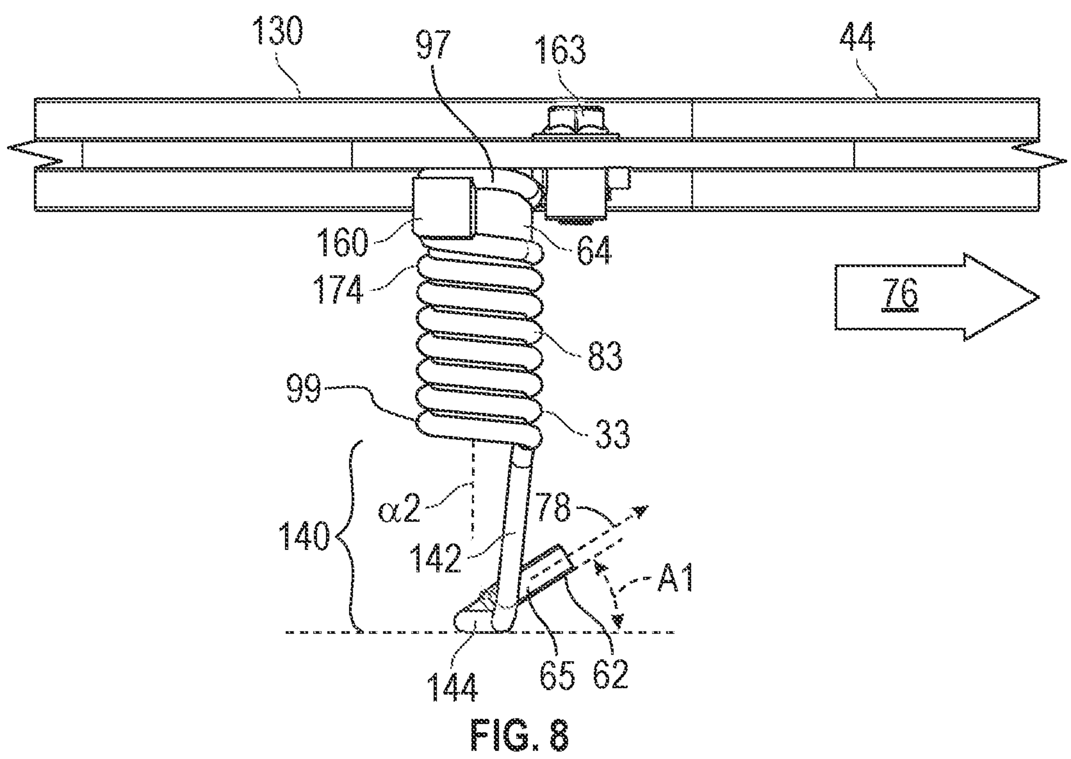
FIG. 8 is a top plan view of the snowmobile track frame and ice scratcher of FIG. 6.
Figure 9:
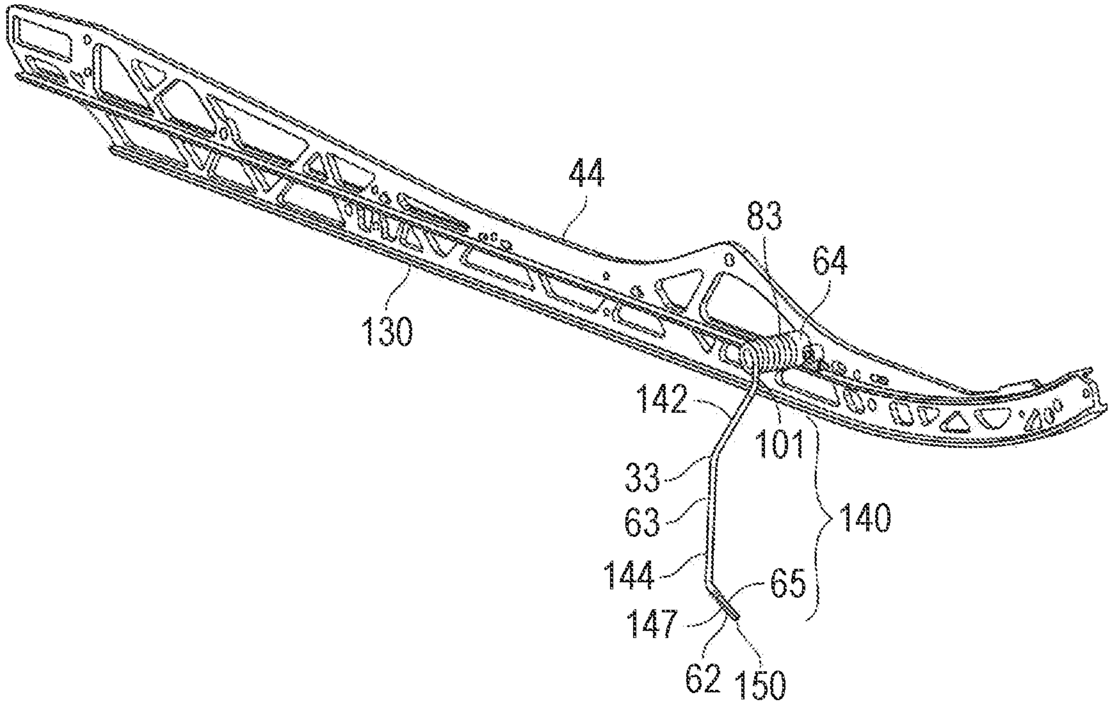
FIG. 9 is a perspective view of the snowmobile track frame and ice scratcher of FIG. 6.
Figure 10:
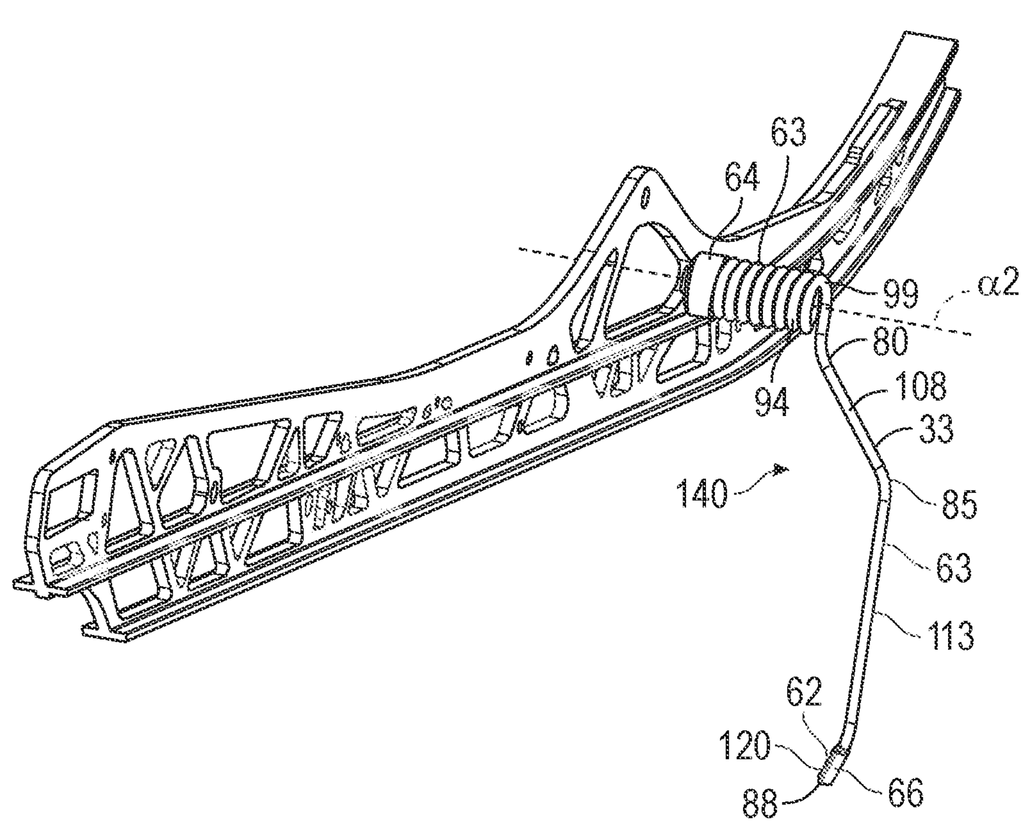
FIG. 10 is a forward looking perspective view of the snowmobile track frame and ice scratcher of FIG. 6.
Figure 11:
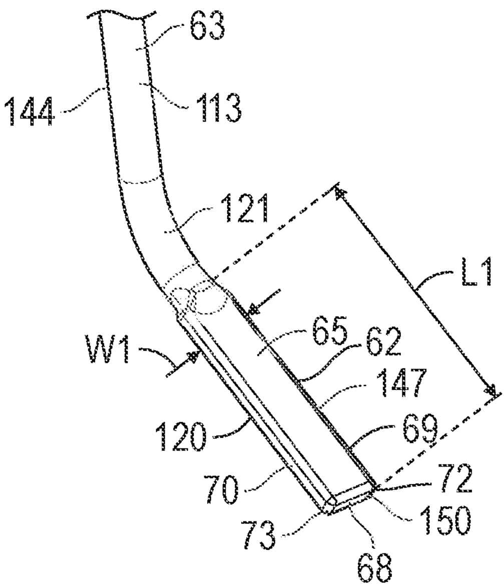
FIG. 11 is a detailed perspective view of the distal end portion of the ice scratcher of FIGS. 6-10.
Figures 12, 13:
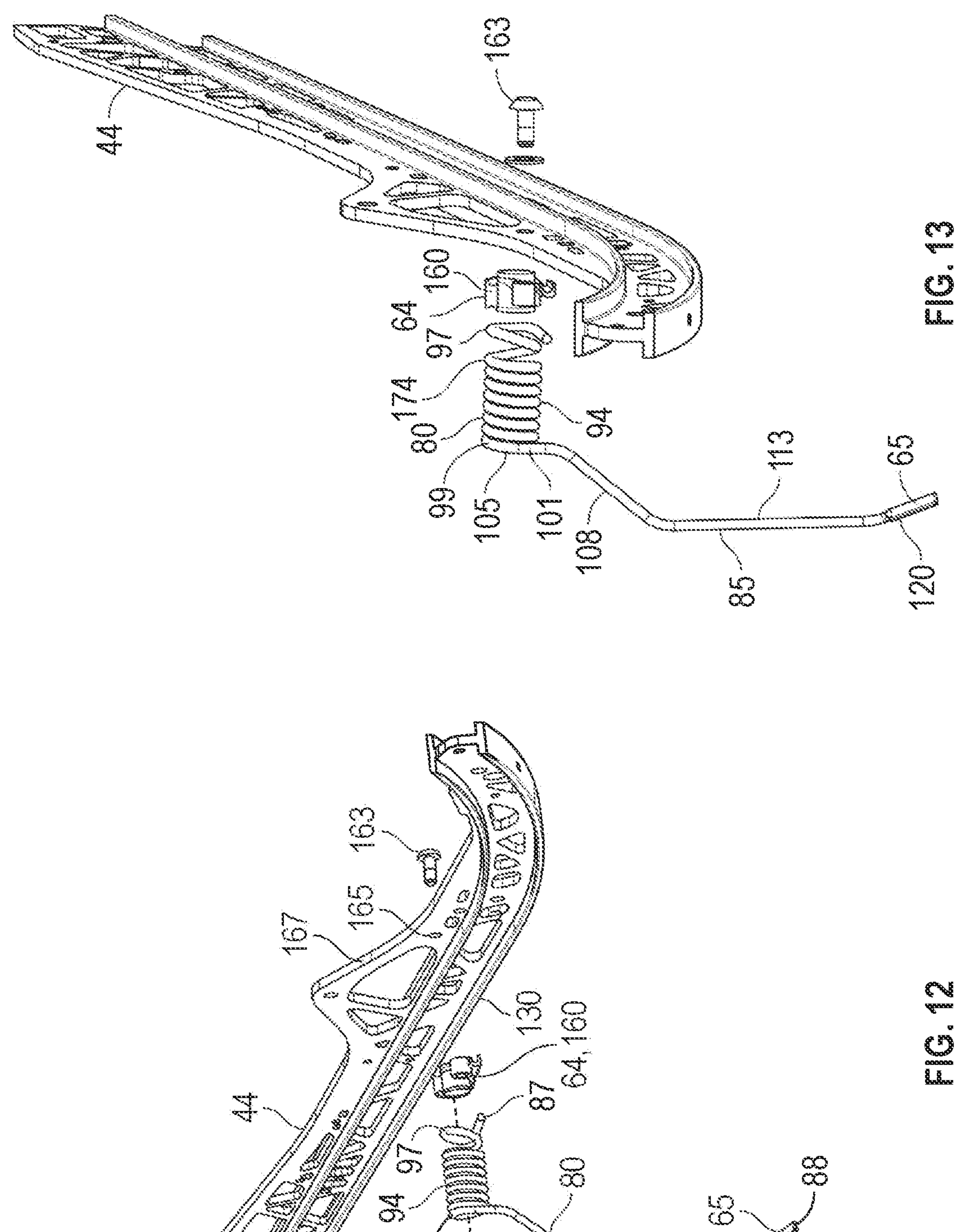
FIG. 12 is an exploded view of the snowmobile track frame and ice scratcher of FIGS. 6-10.
FIG. 13 is another exploded view of the snowmobile track frame and ice scratcher of FIGS. 6-10.

Referring to FIGS. 6-11, in addition to FIGS. 1-5, details of the ice scratcher 33 are illustrated in an attached, deployed, and non-deflected position. In embodiments, the ice scratcher 33 generally has an elongate snow/ice spray generating portion 62 supported by a support portion 63, and with an attachment component 64 that secures the ice scratcher to the snowmobile 33. The snow/ice spray generating portion 62 may be rectangular or paddle shaped, having a upper flat surface 65, a lower flat surface 66, and having a forward leading edge 68, side edges 69, 70. The forward leading edge 68 is the lowermost portion of the ice cutter when deployed. A pair of corners 72, 73 are defined by the juncture of the side edges 69, 70 and the forward leading edge 68. In embodiments, one of the two corners may be the lowermost corner of the ice scratcher. As illustrated in FIG. 11, the length L1 of the snow/ice spray generating portion may extend 25 to 35 mm in embodiments. The length of the flat upper surface may also extend 25 to 35 mm in embodiments. The width W1 of the snow/ice spray generating portion may be 5.5 to 8 mm in embodiments. As best illustrated by FIG. 6, which correlates to a side view of the snowmobile, and where the arrow 76 indicates the forward direction of travel of the snowmobile, the elongate snow/ice spray generating portion 62 extends downwardly and forwardly with respect to the snowmobile, in the direction of forward travel of the snowmobile. As best illustrated by FIG. 8, which correlates to a top view of the snowmobile, the elongate snow/ice generating portion 62 extends inwardly toward the snowmobile track frame and forwardly, in the forward direction of travel 76 of the snowmobile. FIG. 5, a view at the rear of the snowmobile, illustrates that the elongate snow/ice spray generating portion 62 extends downwardly and inwardly with respect to the snowmobile.

In embodiments, the flat surface area of the snow/ice spray generating portion of greater than 30 $mm^2$ and less than 150 $mm^2$. In embodiments, the flat surface has a surface area of more than 30 $mm^2$. In embodiments, the flat surface has a surface area of less than 150 $mm^2$.

As illustrated by FIGS. 6, 7, and 8, in embodiments, the upper flat surface 65 of each ice scratcher in an undeflected state faces forwardly and upwardly, and as best shown in FIG. 5 and FIG. 7 which correlates to a view from the front of the snowmobile, the upper flat surface 65 also faces inwardly toward the snowmobile. Vector 78, of FIGS. 5, 6 and 7, is drawn normal to the upper flat surface and is illustrative of the orientation direction, that is, the facing direction, of the upper flat surface as seen in the various views in the undeflected position. Vector 78' of FIG. 6 indicates the orientation of the upper flat surface when deflected by engagement of ice when the snowmobile is moving forwardly. The vector 78' continues to point forwardly and inwardly but the upward pointing orientation is reduced and the flat surface may be oriented horizontally or even slightly downward from the horizontal. Additionally, snow/ice spray generating portion, the upper flat surface, is elevated as the ice scratcher is moved rearwardly as the leg portion generally pivots about the coil and outer coils of the coil portion may be slightly raised. Additionally, the snow/ice spray generating portion may be pushed laterally outward depending on the configuration of the snow/ice spray generating portion.

Referring to FIGS. 6-13, details of embodiments of the ice scratcher and the securement to the snowmobile are depicted. The elongate snow/ice spray generating portion 62 may be a unitary part of a wire form 80 that has a coil portion 83 with an axis $\alpha 2$ and a downwardly extending leg portion 85. The wire form has a first end 87 and a second end 88, the second end is at the forward leading edge 68 of the elongate snow/ice spray generating portion 62. The first end is at a straight anchor segment portion 91 suitable for anchoring the wire form to the snowmobile. The coil portion comprises a plurality of coil windings 94 that in embodiments is at least four and not more than twelve coil windings and includes a proximal coil winding 97 and a distal coil winding 99. In embodiments, the downwardly leg portion 85 is defined by a plurality of leg segment portions. With particular reference to FIG. 7, each leg segment portion is straight or generally straight and has a bend separating the leg segment portion from an adjacent leg segment portion. A first leg segment portion 101 extends from the most distal coil winding 99 at a first juncture 105. The first leg segment portion 101 connects to a second leg segment portion 108 at second juncture 111 configured as a bend in the wire form. The second leg segment portion connects to a third leg segment portion 113 at third juncture 115 configured as a bend in the wire form. The third leg segment portion 113 connects to a fourth leg segment portion 120 at fourth juncture 121 configured as a bend in the wire form. In embodiments, the fourth leg segment portion 120 is the most distal leg segment portion and defines the elongate snow/ice spray generating portion 62.

Continuing to refer to FIGS. 6-13, when viewed from the side of the snowmobile, as illustrated by FIG. 6, the leg portion 85 has an expanded L-shape with the lower leg of the L being the most distal leg segment portion 120 and is the elongate snow/ice spray generating portion 62. When viewed from the front of the snowmobile, as best shown in FIG. 7, the leg portion has an expanded C-shape, with the lower leg of the C being the most distal leg segment portion 120 and is the elongate snow/ice spray generating portion 62. The middle leg of the C being the third leg segment portion 113 and the upper leg of the C being the second leg segment portion 108. The C-shape of the leg portion 85 can also be seen from the rear of the snowmobile as illustrated by FIG. 5. In embodiments, a C-shape may be provided without a plurality of or any straight leg segments with the wire form having a continuous or near continuous curve that positions the snow ice generating portion 62 such that its axis $\alpha$3 extending therefrom points inward toward the snowmobile, downward, and forwardly.

Figures 14A, 14B, 14C:
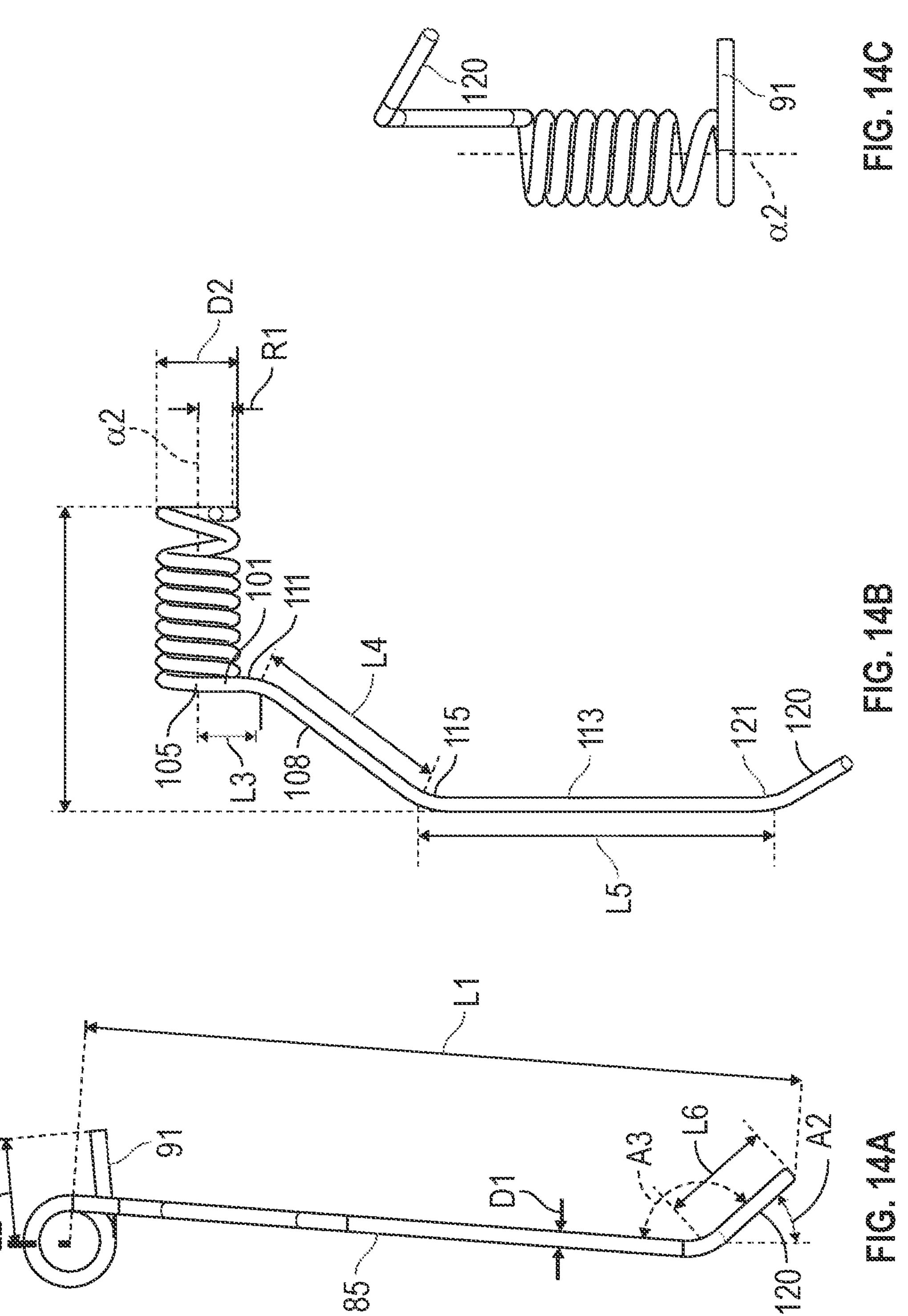
FIG. 14A is a side elevational view of the wire form of an ice scratcher in accord with embodiments.
FIG. 14B is a front elevational view of the wire form of FIG. 14A.
FIG. 14C is a top plan view of the wire form of FIG. 14A.

Referring to FIGS. 14A-14C, details of an embodiment of the wire form 80 are depicted. The wire form is formed from a length of wire, for example, spring steel wire. In embodiments, the wire of the wire form may have a nominal diameter D1 of about 5 mm. In embodiments the diameter D1 of the wire of the wire form may vary from about 3 mm to about 7 mm. In embodiments, the wire form has a nominal diameter between 3.75 and 5.75 mm. In embodiments, the coil portion 83 has an axis $\alpha$1 and the individual windings 94 may have a nominal radius R1 of about 12.5 mm. In embodiments, the nominal radius R1 may be in the range of about 8 to about 16 mm. In embodiments, the coil portion 83 may have an outside diameter D2 of about 30 mm. In embodiments, the coil portion outside diameter D2 may be in a range of 20 to 35 mm inclusively. In embodiments, the overall length L1 of the leg portion 85 may be about 240 mm. The length L2 of the anchor leg segment portion 91 may be about 35 mm from the first end 87 to the most proximal coil winding 97. The length L3 of the of the first leg segment portion 101, as measured from lines through the apex of the bends at the junctures 111, 115 may be about 35 mm. The length L4 of the second leg segment portion 108 may be about 65 mm. The length L5 of the third leg segment portion 113 may be about 120 mm. The length L6 of the fourth leg segment portion 120 may be about 35 mm in embodiments.

Referring to FIGS. 8 and 14C, the fourth leg segment portion 120 which in embodiments is the elongate snow/ice spray generating portion 62, when viewed from above in the undeflected position is directed inwardly and forwardly at a forward angle A1 of about 30°, as measured from a line parallel to the snowmobile axis $\alpha$1. In embodiments, the angle A1 is greater than 0°. In embodiments, the angle A1 may be in the range of 0° to about 45°. In embodiments, the angle A1 may be in a range of about 10° to about 38°. When the ice scratcher is engaging ice or snow moving the leg portion rearwardly, this angle may increase with the flexing of the wire form but the snow/ice spray generating portion will continue to point inwardly and forwardly and in embodiments the angle A1 will be less than about 60 degrees when the wire form in and will continue. Referring to FIGS. 6 and 14A, when viewed from the side of the snowmobile, the angle A2 of the fourth leg segment portion 120 which in embodiments is the elongate snow/ice spray generating portion 62, to a vertical line 129, defined as a line perpendicular to the axis $\alpha$1 of the snowmobile, is about 40°. In embodiments the angle A2 is in the range of about 20° to about 55°. In embodiments the angle A2 is in the range of about 15° to about 70°. Referring to FIG. 14A, when viewed from the side, the obtuse angle A3 between the third leg segment portion 113 and the fourth leg segment portion is about 135°. In embodiments, the obtuse angle A3 is in the range of 120 to 170°. In embodiments, the obtuse angle A3 is in the range of about 125° to about 145°. The upper flat surface 65 and lower flat surface 66 of the snow/ice spray generating portion 62 may be formed by stamping or machining the fourth leg segment portion 120. In embodiments, a separate snow/ice spray generating portion may be attached to an adjoining leg segment by welding or fastening it with fasteners, crimping or the like. In addition to being rectangular, the snow/ice spray generating portion may have other shapes, including but not limited to triangular, or oval, and may have a leading edge that is pointed or rounded or straight, and may be sharpened or blunt. In embodiments, the snow/ice spray generating portion may be flattened with a planar surface or may have a curved concave or convex surface, each with widths greater than the width of the adjoining portion of the wire form.

Referring to FIGS. 7-10, the configuration of the leg portion defines a hook 140 that has a first hook portion 142 that extends downwardly outwardly, transitions to a second hook portion 144 that extends downwardly and rearwardly, and then transitions to a third and leading forward hook end portion 147 with a hook point 150 that extends forwardly and downwardly, the three hook portions defining the completed hook shape with the hook point 150 that is pointed forwardly and inwardly. In combination with the resilient coiled spring portion 83 unitary with the hook 140, the ice scratcher has improved structural strength to aggressively dig into hard pack snow and/or ice without permanent deformation and providing a spray of ice/snow that is focused upwardly and inwardly as opposed to upwardly of conventional snowmobile ice scratchers. The forward and downward angulation of the hook end portion and hook point effectuates more of a digging and fracturing action as compared to the dragging and scrapping action of most conventional ice scratchers. The inward and downward angulation of the hook end portion and hook tip effectuates an inward launching of the snow/ice dug up and fractured. In embodiments, the flattened top, the upper flat surface 65, of the hook end portion is believed to provide an increase in the volume of the snow/ice dug up and fractured as well as providing an enhanced inward launching action of the ice/snow dug up and fractured, thereby providing more snow/ice spray to the track assemblies and the heat exchanger.

Figures 15A, 15B, 15C:
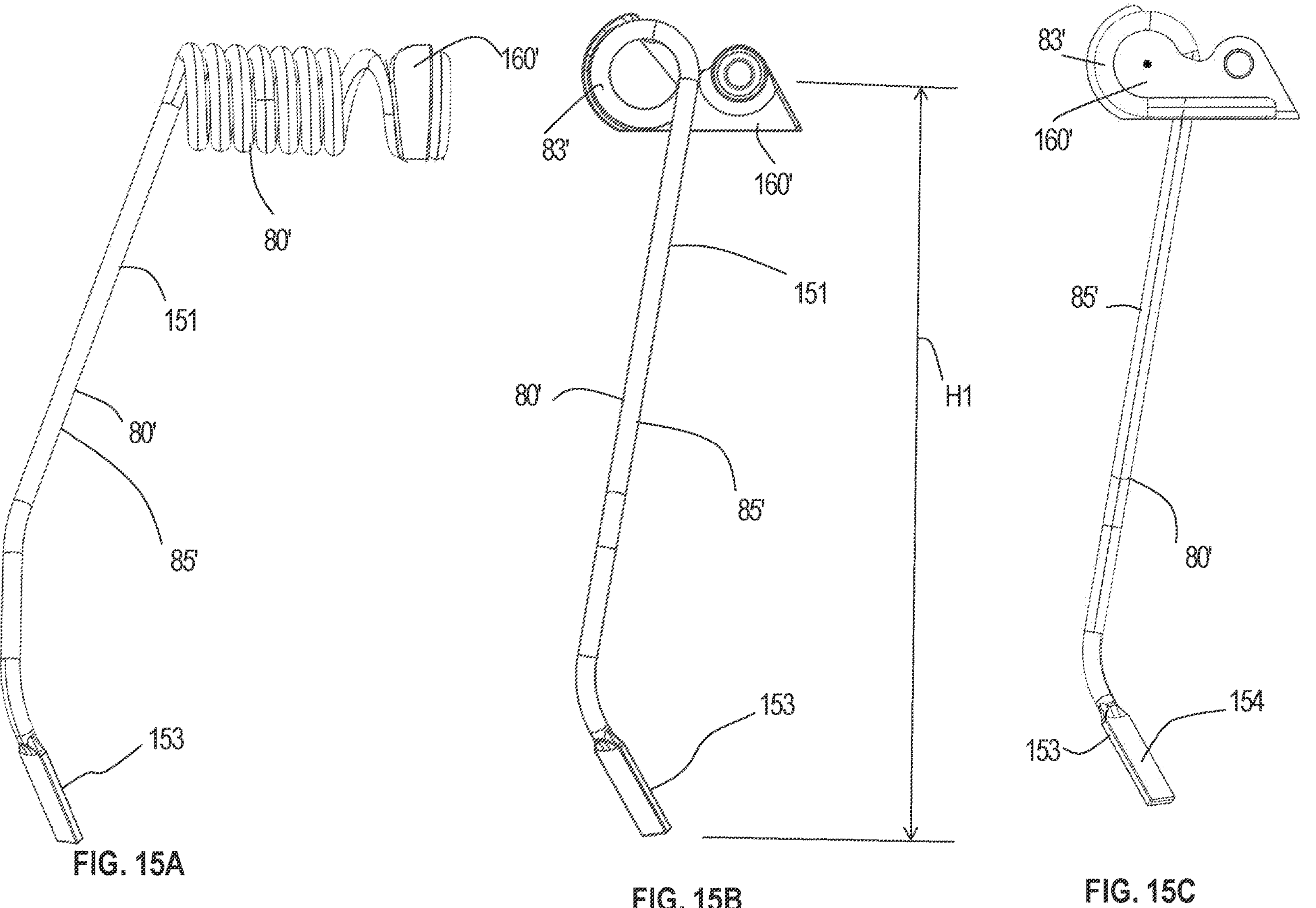
FIG. 15A is a rear elevational view of an ice scratcher for the left side of a snowmobile in accord with embodiments.
FIG. 15B is a side elevational view of a right side ice scratcher at the side facing outwardly from the snowmobile.
FIG. 15C is a side elevational view of the ice scratcher of FIG. 15A at the side facing the snowmobile.
Figure 16B:
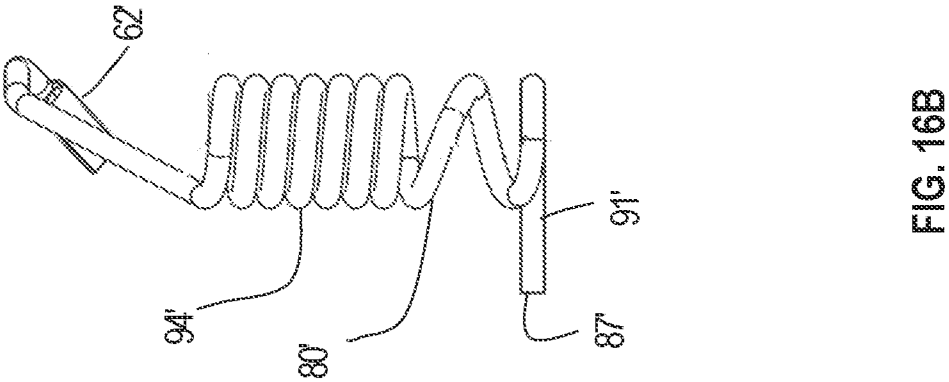
FIG. 16B is a top plan view of the wire form of FIG. 16A.

Referring to FIGS. 15-16B, another embodiment of an ice scratcher is illustrated. The ice scratcher has a wire form 80' with a coil portion 83' and a leg portion 85'. The leg portion extends generally straight from the coil without the upper leg segment in the previous embodiment. The leg portion, when viewed from the front of the ice scratcher parallel to an axis of the snowmobile to which the form is mounted, having a C-shape with the upper leg 151 of the C extending most of the vertical height of the leg portion. The leg portion having a first modest bend 152 that is positioned in the lower half of the leg portion. The bend having a radius of curvature of at least 15 mm in embodiments. In embodiments the bend having a radius of curvature of at least 20 mm. In embodiments the bend having a radius of curvature of at least 40 mm. The lower leg 153 of the C-shape constituting a snow/ice generating portion and in embodiments having a flat upper face 154 with a width greater than the wire diameter. The flat upper face 154 facing upwardly, forwardly, and inwardly when the wire form is in the undeflected position, as described in association with the embodiment of FIGS. 6-13. When deflected the flat upper face 154 continues to face inward and forward. It may further face upwardly or the deflection may rotate the lower leg of the C-shaped wire form where it is horizontally facing or facing slightly downward.

The height H1 of the C-shaped leg portion of FIGS. 14A to 15C, as mounted on the snowmobile, being in the range of about 190 to about 210 mm. In embodiments, a height H1 of the leg portion as mounted on the snowmobile being in the range of about 165 to about 230 mm.

Figure 16A:
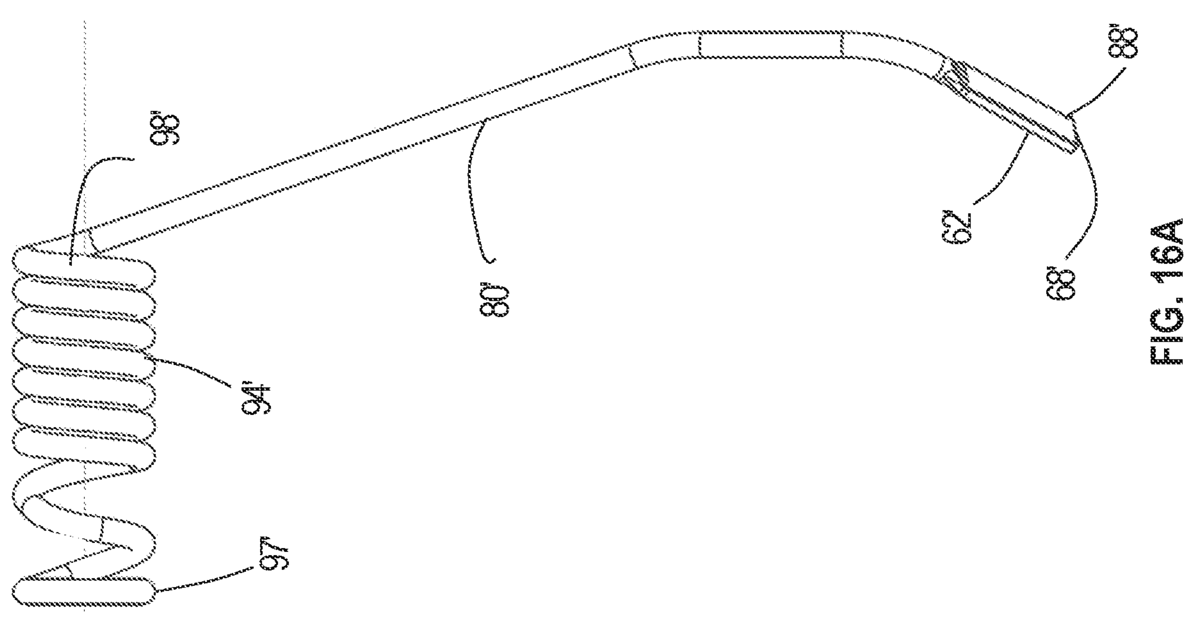
FIG. 16A is a is a backside elevational view of a right side wire form.

In FIGS. 15A to 15C the wire form 80' is attached to an attachment component configured as a mounting block 200. In FIGS. 16A and 16B, the wire form 80' is shown in isolation. The wire form has a first end 87' and a second end 88', the second end is at the forward leading edge 68' of the elongate snow/ice spray generating portion 62'. The first end is at a straight anchor segment portion 91' suitable for anchoring the wire form to the snowmobile. The coil portion comprises a plurality of coil windings 94' that in embodiments is at least four and not more than twelve coil windings and includes a proximal coil winding 97' and a distal coil winding 99'.

Referring to FIGS. 8-10, 12-13, and 17-28, the wire form is secured to the track frame 44, for example at the straight portion 130 of the frame 44, by way of an attachment component 64. The attachment component may be configured as a mounting block 160 and be positioned within the coil as illustrated such that the most proximal coil winding 99 may be sandwiched and clamped between the mounting block 160 and the track frame 44 by way of threaded fastener 163 that extends through an aperture 165 in the track frame webbing 167 and engages with internal threads 169 in the mounting block 160. The mounting block may have an inward facing arcuate recess 171, "inward" with respect to the snowmobile, for receiving a portion of the proximate coil winding 97, and an outward facing recess 173 that receives the coil winding 174 next to the proximate coil winding 97. A further straight recess 177 may receive the straight anchor segment portion 91 and clamp same to the track frame when the mounting block is secured thereto.

Referring to FIGS. 19-28, additional embodiments of attachment components configured as mounting blocks are illustrated. Mounting block 181 of FIGS. 19 and 20, has a through hole 183 in alignment with the axis of the coil portion 83 when assembled. The through hole may be threaded for receiving a threaded fastener or may have a smooth bore and have a nut, not shown, positioned on the distal side 190 of the mounting block. The mounting block 181 has recesses for the coil windings 171, 173 and anchor segment portion 177 as illustrated in the mounting block 160 of FIGS. 6-18.

Figures 17, 18, 19, 20, 21, 22:
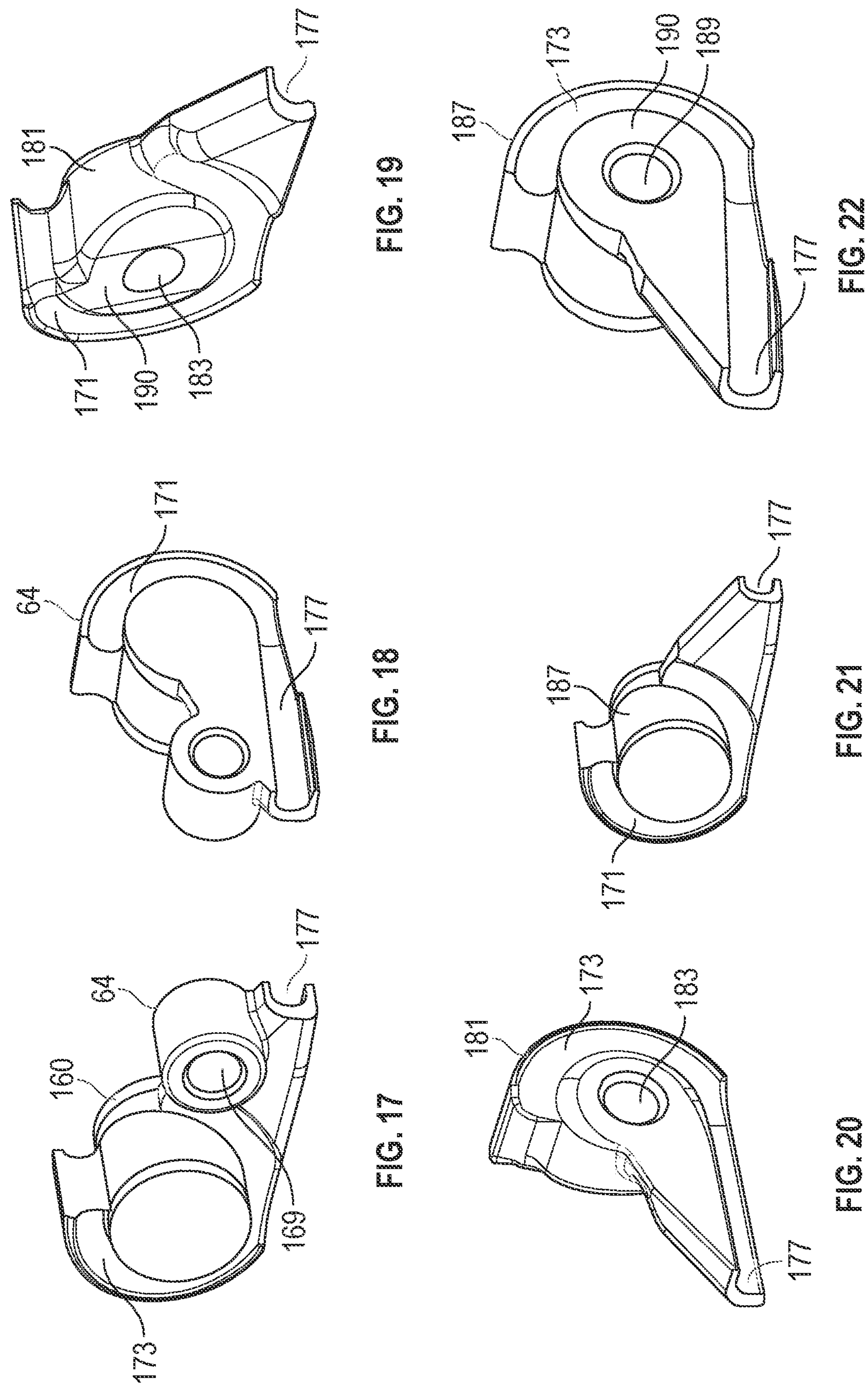
FIG. 17 is a perspective view of an attachment component for connecting the wire form to the snowmobile track frame according to embodiments.
FIG. 18 is another perspective view of the attachment component of FIG. 17.
FIG. 19 is a perspective view of another attachment component for connecting the wire form to the snowmobile track frame according to embodiments.
FIG. 20 is another perspective view of the attachment component of FIG. 19.
FIG. 21 is a perspective view of another attachment component for connecting the wire form to the snowmobile track frame according to embodiments.
FIG. 22 is another perspective view of the attachment component of FIG. 21.
Figures 23, 24, 25, 26, 27, 28:
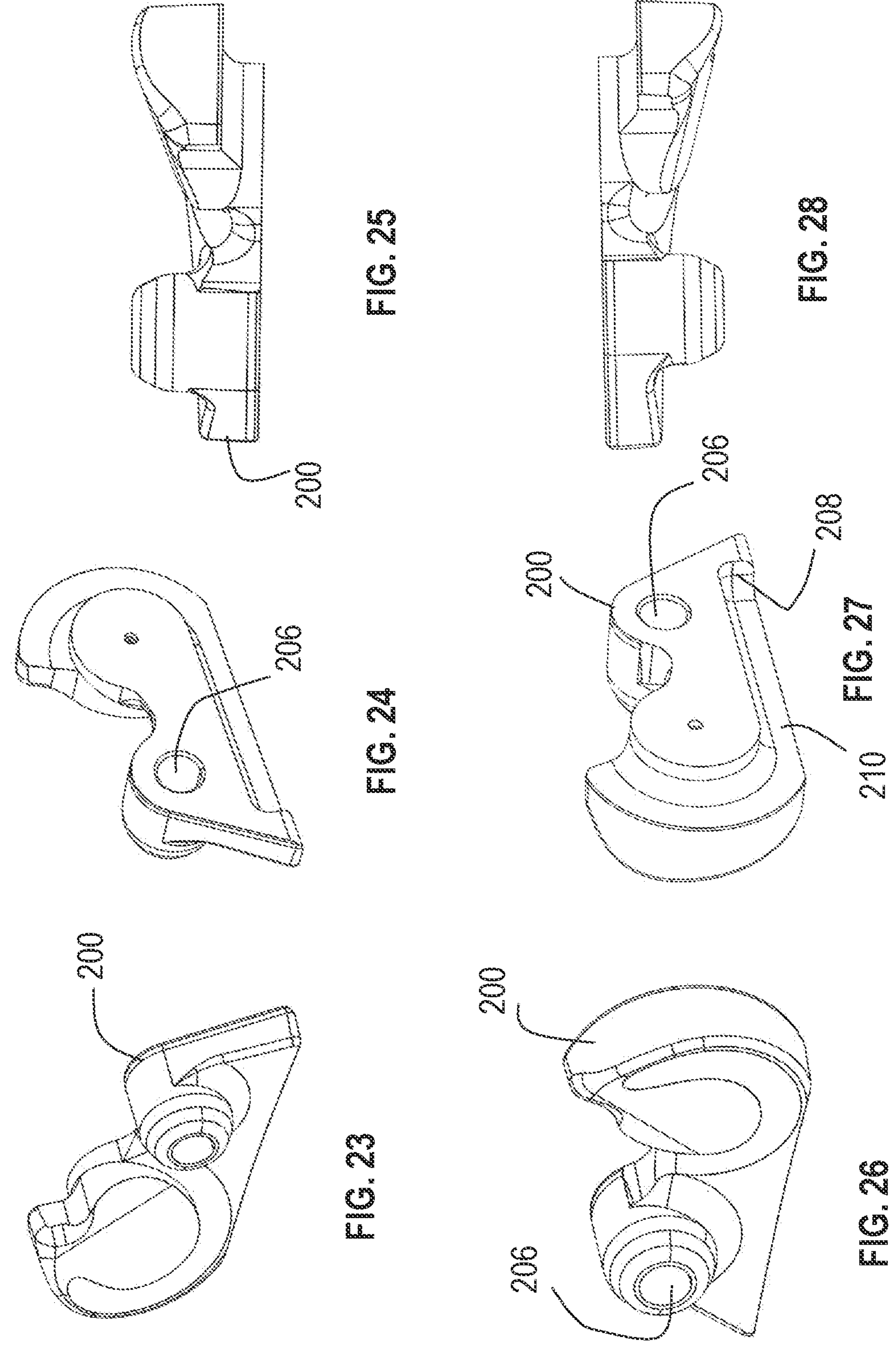
FIG. 23 is a perspective view of the outwardly facing side of a right side mounting block according to embodiments.
FIG. 24 is a perspective view of the side facing the track of the mounting block of FIG. 23.
FIG. 25 is a top plan view of the mounting block of FIG. 23.
FIG. 26 is a perspective view view of the outwardly facing side of a left side mounting block according to embodiments.
FIG. 27 is a perspective view of the side facing the track of the mounting block of FIG. 26.
FIG. 28 is a top plan view of the mounting block of FIG. 26.
Figure 29:
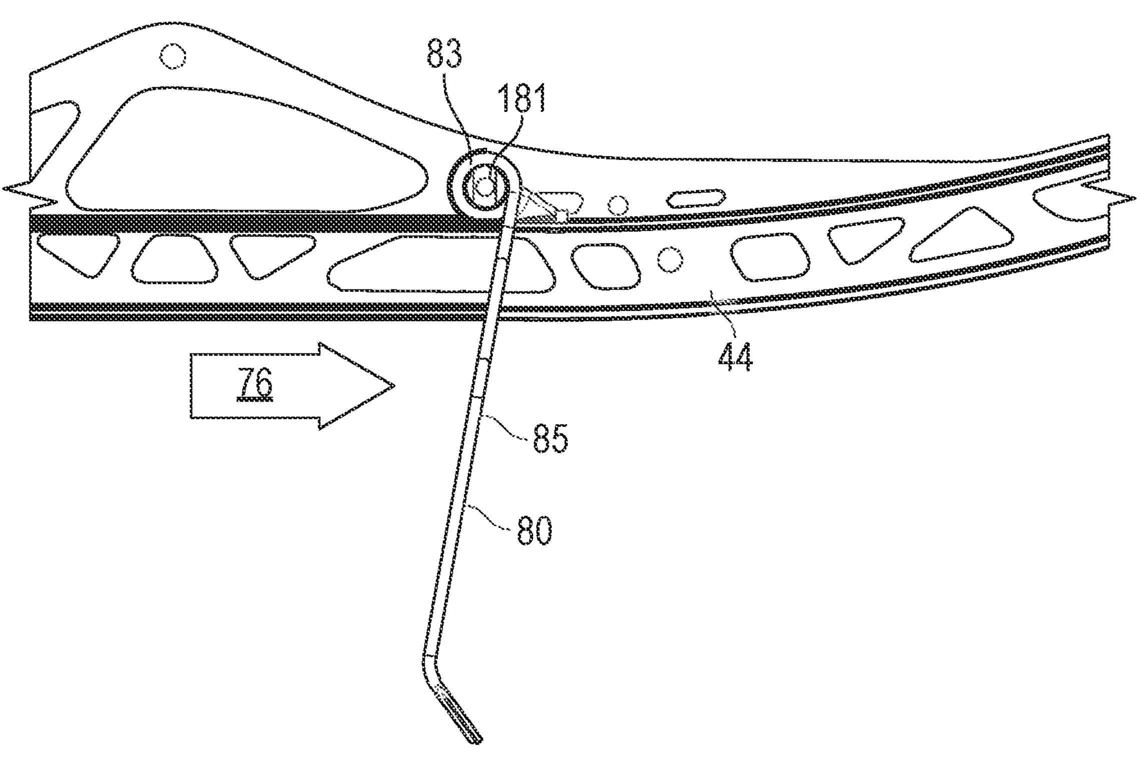
FIG. 29 is a side elevational view of an ice scratcher with a wire form attached to a snowmobile track frame by way of the attachment component of FIGS. 19 and 20.
Figure 30:
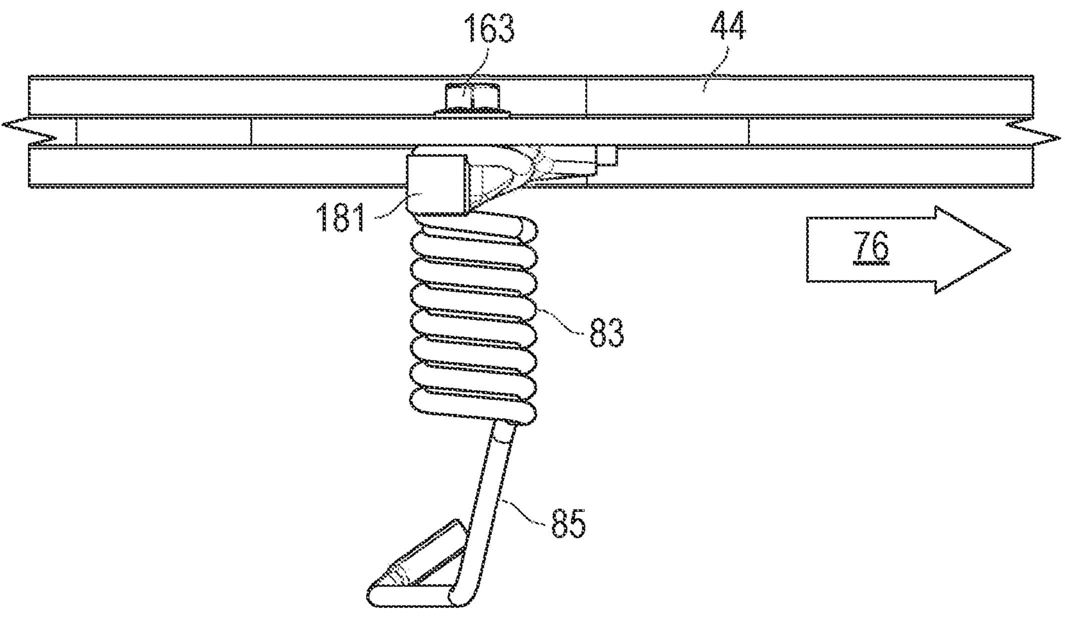
FIG. 30 is a top plan view of the ice scratcher and snowmobile track frame of FIG. 29.
Figure 31:
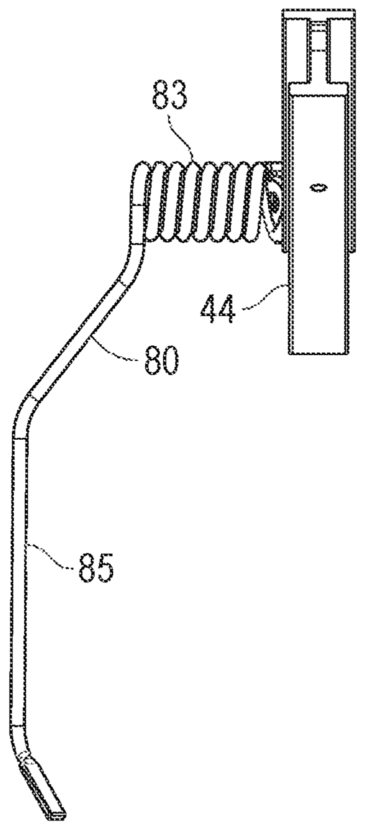
FIG. 31 is a front elevational view of the ice scratcher and snowmobile track frame of FIG. 29.

Mounting block 187 of FIGS. 21 and 22 has a threaded blind hole 189 in alignment with the axis of the coil portion 83. The mounting block 187 also is illustrated with recesses for the coil windings 171, 173 and anchor segment portion 177. FIGS. 27-29 illustrate the mounting block 181 with the through hole 183 securing the wire form 80 to the track frame 44. In embodiments, the wire form may be mounted without such mounting components for example directly fastened to the frame with threaded or other fasteners.

Mounting block 200, illustrated at attached to wire form 80' in FIG. 15A-15C, is illustrated in isolation in FIGS. 23-28. FIGS. 23-25 are right side mounting blocks and FIGS. 26-28 are left side mounting blocks. The mounting blocks have a hole 206, that can be a through hole for use with a bolt-nut combination or may be a threaded blind hole. The hole may be threaded. The mounting block has a stop surface 208 at the groove 210 that receives the first end 87' of the wire form 80'. The mounting block clamps the wire form to the track frame fixes the proximal coil 97' at the mounting block, securing the wire form to the track frame.

In some examples, the arrangement of components of snowmobiles may be the same as or substantially similar to one or more of the arrangements of components described in the following patents and patent publication owned by the owner of the instant application U.S. Patent Publication and U.S. Pat. Nos. 7,559,576; 9,796,437; 9,845,004; US20180334211, the disclosures of which are incorporated herein by reference in their entirety.

In some examples, the arrangement of components of snowmobiles may be the same as or substantially similar to one or more of the arrangements of components described in: U.S. Pat. Nos. 4,076,089; 5,277,266; 8,646,559; 9,610,987, the disclosures of which are incorporated herein by reference in their entirety.

When dimensions are cited herein or claimed and the adjective "about" is utilized in association with the specified dimension, the range of the dimension is to be considered as plus or minus 10% of the specified dimension. In embodiments, the ice scratcher could have more than one coil spring portion or no coil spring portion.

All the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

The following clauses illustrate example subject matter described herein.

Clause 1: An ice scratcher for a snowmobile, the snowmobile having a forward-rearward axis, the ice scratcher comprising a wire form having a coiled spring portion for attachment to the track frame of the snowmobile and a leg portion extending downwardly from the coiled spring portion for engagement with a snow/ice surface upon which the snowmobile is traveling, when attached to the snowmobile track frame the coiled spring portion having an axis extending laterally from snowmobile, when viewed from behind the snowmobile looking forward along the forward rearward axis of the snowmobile, the leg portion having a C-shape with the C opening toward the snowmobile, when so attached and viewed from the side of the snowmobile, the leg portion having an expanded L-shape with the upper leg of the L-shape being upright and extending downwardly from the coiled spring portion and with the lower leg of the L-shape extending forwardly and downwardly from a lower end of the upper leg, the inside angle between the upper leg and lower leg being greater than 110°.

Clause 2: The ice scratcher of clause 1, further comprising a mounting component for attachment of the coiled spring portion, the coiled spring portion comprising a plurality of coils including a most inward coil and a most outward coil, and wherein the mounting component is attachable to the snowmobile track frame with a threaded fastener extending through an opening in the snowmobile track frame into a fastener opening in the mounting component, the mounting component having a groove for receiving at least a portion of the innermost coil, wherein when the mounting component is attached to the snowmobile track frame with the threaded fastener, the at least a portion of the innermost coil is clamped between the mounting component and the snowmobile track frame.

Clause 3: The ice scratcher of clause 1, wherein when attached to the snowmobile track frame, the leg portion has a lowermost leg segment portion that defines the lower leg of the L-shape, the lowermost leg segment portion having a flat surface that faces upwardly, forwardly, and inwardly with respect to the snowmobile.

Clause 4: The ice scratcher of clause 3, wherein when attached to the snowmobile track frame, the flat surface is entirely inward of an outermost extent of the leg portion.

Clause 5: The ice scratcher of clause 1, wherein when attached to the snowmobile, the leg portion has a lowermost leg segment portion that defines the lower leg of the L-shape, the lowermost leg segment portion having a flat surface that faces upwardly, forwardly, and inwardly with respect to the snowmobile.

Clause 6: The ice scratcher of clause 5, wherein the flat surface has a surface area of more than 30 $mm^2$.

Clause 7: The ice scratcher of clause 5, wherein the flat surface has a surface area of less than 150 $mm^2$.

Clause 8: An ice scratcher for a snowmobile, the snowmobile having a forward rearward axis, the ice scratcher having a support portion attachable to the snowmobile and an elongate paddle shaped ice/snow spray generating portion at a lowermost end of the ice scratcher when attached to the snowmobile, the ice scratcher having a non deflected position that is below a lowermost track level of the snowmobile, the ice/snow generating portion having a flat surface that faces upwardly, forwardly, and inwardly when the ice scratcher is attached to the snowmobile and is in the non deflected position.

Clause 9: The ice scratcher of clause 8, comprising a wire form having a coil portion and a leg portion extending from the coil portion.

Clause 10: The ice scratcher of clause 8, wherein the leg portion has a C-shape when viewed in a direction parallel to the forward rearward axis.

Clause 11: The ice scratcher of clause 9, wherein the ice/snow generating portion is a flattened portion of a distal end portion of the wire form, the flattened portion having a width greater than a nominal diameter of a wire length forming the wire form.

Clause 12: The ice scratcher of clause 8, wherein the flat surface has a surface area of more than 30 $mm^2$.

Clause 13: The ice scratcher of clause 5, wherein the flat surface has a surface area of less than 150 $mm^2$.

Clause 14: The ice scratcher of clause 13, comprising a wire form having a coil portion and a leg portion extending from the coil portion, the coil portion fixed to the snowmobile at a track frame portion.

Clause 15: An ice scratcher for a snowmobile, the snowmobile having a forward rearward axis, the ice scratcher comprising a single length of wire formed into a resilient wire form, the length of wire having a first end and an opposite second end, the form at the first end defining an anchor portion segment, the form having a coiled spring portion connecting to the anchor portion segment, the coiled spring portion comprising a plurality of coils and having a coiled spring portion axis, the plurality of coils including an innermost coil proximate the first end of the length of wire, and an outermost coil, the wire form further comprising a leg portion extending from the outermost coil, the leg portion having a proximal leg segment portion joining the outermost coil at a first juncture, the proximal leg segment portion joining a first mid leg segment portion at a second juncture, the first mid leg segment portion joining a second mid leg segment portion at a third juncture, the second mid leg segment portion joining a distal leg segment portion at a fourth juncture, the distal leg segment portion including the second end, wherein when the ice scratcher is mounted on a snowmobile track frame with the axis of the coiled spring portion extending laterally from the snowmobile track frame, the ice scratcher having an undeflected position with the leg portion extending downwardly, the leg portion configured such that, when viewed from an end of the snowmobile, has an expanded C-shape with the second mid leg segment portion being upright and being positioned as the outermost leg segment portion of the proximal leg segment portion, the first mid leg segment portion, the second mid leg segment portion, and the distal leg segment portion.

Clause 16: The ice scratcher of clause 15, wherein when the ice scratcher is mounted on the snowmobile, when viewed from the side looking at the axis of the coiled spring portion, the proximal leg segment portion is linearly aligned with the mid leg segment portion, the proximal leg segment portion and the mid leg segment portion extending downwardly and rearwardly from the coiled spring portion, the distal leg segment portion extends downwardly and forwardly from the third juncture.

Clause 17: The ice scratcher of clause 15, wherein the ice scratcher is securable to the track frame of the snowmobile by a mounting fixture that clamps the innermost coil between the mounting fixture and the snowmobile frame.

Clause 18: The ice scratcher of clause 15, wherein the distal leg segment portion has a flat surface, the flat surface facing upward, forward, and inward when the ice scratcher is attached to the snowmobile in the undeflected position.

Clause 19: The ice scratcher of clause 18, wherein the flat surface has a surface area of greater than 30 $mm^2$ and less than 150 $mm^2$.

Clause 20: The ice scratcher of clause 15, wherein the wire length has a nominal diameter between 3.75 and 5.75 mm.

Clause 21: An ice scratcher for a snowmobile, the snowmobile having a forward rearward axis, the ice scratcher having a wire form having a coil portion and a unitary hook, the wire form attachable to the snowmobile, whereby when the wire form is attached to the snowmobile, the coil portion having an axis directed transverse to the forward rearward axis of the snowmobile the hook extending downwardly, the hook comprising a first hook portion that extends outwardly from the snowmobile, the first hook portion transitioning to a second hook portion that extends downwardly, the second hook portion transitioning to a third and leading forward hook portion with a hook tip that extends forwardly, downwardly and inwardly.

Clause 22: The ice scratcher of clause 21, wherein the first hook portion also extends downwardly.

Clause 23: The ice scratcher of clause 21, wherein the first hook portion also extends downwardly and rearwardly.

Clause 24: The ice scratcher of clause 23, wherein the second hook portion also extends rearwardly.

Clause 25: The ice scratcher of clause 21, wherein the third and leading forward hook portion has a flat surface that faces upwardly, inwardly, and forwardly.

Clause 26: An ice scratcher for a snowmobile, the snowmobile having a forward rearward axis, the ice scratcher having a wire form having a coil portion and leg portion extending therefrom, the wire form attachable to the snowmobile and having a non-deflected position and a deflected position when the snowmobile is moving forward on an ice surface, whereby when the wire form is attached to the snowmobile, the coil portion having an axis directed transverse to the forward rearward axis of the snowmobile and the leg portion having a C-shape, when the wire form is in the non-deflected position the upper leg of the C-shaped leg portion extending downwardly, outwardly from the snowmobile, and forwardly from the coil portion, and the lower leg of the C-shaped leg portion extending downwardly, forwardly, and inwardly toward the snowmobile, the lower leg having a flattened upper surface that faces upwardly, forwardly and inwardly when the wire form is in the non-deflected position.

Clause 27: The ice scratcher of clause 26, wherein when the wire form is in the deflected position, the lower leg moves rearwardly with respect to the snowmobile and the flattened upper surface faces forwardly and inwardly and a direction that is lower than the direction it faces in the undeflected position.

Clause 28: The ice scratcher of clause 26 or 27 wherein the flattened upper surface is at an elevated position when at the deflected position compared to the non-deflected position.

Clause 29: A method of providing an ice and snow spray to snowmobile components under a tunnel of the snowmobile, the method comprising:

positioning a paddle on the end of a wire spring with a face of the paddle facing forwardly, inwardly toward the snowmobile, and upwardly;

driving the snowmobile forwardly on a snow ice surface thereby moving the paddle rearwardly to a rearward deflected position with respect to the snowmobile while maintaining the forwardly and inwardly toward the snowmobile orientation of the paddle.

Clause 30: The method of clause 29, wherein the paddle is a flattened part of a wire form and the wire form has a coiled spring, and the method further comprises attaching the wire form at the coiled spring to a track frame of the snowmobile.

Clause 31: The method of clause 29 or 30, wherein the wire form has a downward leg portion extending from a forward side of the coil and the downward extending leg portion is L shaped, and the method comprises positioning the wire form on the snowmobile such that the upper leg of the L extend rearwardly as it extends downwardly and such that the paddle is positioned laterally outward from the coil when viewed from above and below the coil when viewed from the side of the snowmobile.

Clause 32: The method of any of clauses 29-31, further comprising positioning the paddle such that as the paddle moves rearwardly with respect to the snowmobile it also moves upwardly and a direction that the face of the paddle is facing moves downwardly.

Clause 33: The method of any of clauses 29-32 wherein the paddle moves laterally outward from the snowmobile as it moves rearwardly with respect to the snowmobile.

What is claimed is:

1. An ice scratcher for a snowmobile, the snowmobile having a forward-rearward axis, the ice scratcher comprising a wire form having a coiled spring portion for attachment to a track frame of the snowmobile and a leg portion extending downwardly from the coiled spring portion for engagement with a snow/ice surface upon which the snowmobile is traveling, when attached to the snowmobile track frame the coiled spring portion having an axis extending laterally from snowmobile, when viewed from behind the snowmobile looking forward along the forward rearward axis of the snowmobile, the leg portion having a C-shape with the C-shape opening toward the snowmobile, when so attached and viewed from the side of the snowmobile, the leg portion having an expanded L-shape with an upper leg of the L-shape being upright and extending downwardly from the coiled spring portion and with a lower leg of the L-shape extending forwardly and downwardly from a lower end of the upper leg, an inside angle between the upper leg and lower leg being greater than 110°.

2. The ice scratcher of claim 1, further comprising a mounting component for attachment of the coiled spring portion, the coiled spring portion comprising a plurality of coils including an innermost coil and an outermost coil, and wherein the mounting component is attachable to the track frame of the snowmobile with a threaded fastener extending through an opening in the snowmobile track frame into a fastener opening in the mounting component, the mounting component having a groove for receiving at least a portion of the innermost coil, wherein when the mounting component is attached to the snowmobile track frame with the threaded fastener, the at least a portion of the innermost coil is clamped between the mounting component and the snowmobile track frame.

3. The ice scratcher of claim 1, wherein when attached to the track frame of the snowmobile, the leg portion has a lowermost leg segment portion that defines the lower leg of the L-shape, the lowermost leg segment portion having a flat surface that faces upwardly, forwardly, and inwardly with respect to the snowmobile.

4. The ice scratcher of claim 3, wherein when attached to the snowmobile track frame, the flat surface is entirely inward of an outermost extent of the leg portion.

5. The ice scratcher of claim 1, wherein when attached to the snowmobile, the leg portion has a lowermost leg segment portion that defines the lower leg of the L-shape, the lowermost leg segment portion having a flat surface that faces upwardly, forwardly, and inwardly with respect to the snowmobile.

6. The ice scratcher of claim 5, wherein the flat surface has a surface area of more than 30 $mm^2$.

7. The ice scratcher of claim 5, wherein the flat surface has a surface area of less than 150 $mm^2$.

8. An ice scratcher for a snowmobile, the snowmobile having a forward rearward axis, the ice scratcher having a support portion attachable to the snowmobile and an elongate paddle shaped ice/snow spray generating portion at a lowermost end of the ice scratcher when attached to the snowmobile, the ice scratcher having a non deflected position that is below a lowermost track level of the snowmobile, the ice/snow generating portion having a flat surface that faces upwardly, forwardly, and inwardly when the ice scratcher is attached to the snowmobile and is in the non deflected position.

9. The ice scratcher of claim 8, comprising a wire form having a coil portion and a leg portion extending from the coil portion.

10. The ice scratcher of claim 2, wherein the leg portion has a C-shape when viewed in a direction parallel to the forward rearward axis.

11. The ice scratcher of claim 9, wherein the ice/snow generating portion is a flattened portion of a distal end portion of the wire form, the flattened portion having a width greater than a nominal diameter of a wire length forming the wire form.

12. The ice scratcher of claim 8, wherein the flat surface has a surface area of more than 30 $mm^2$.

13. The ice scratcher of claim 8, wherein the flat surface has a surface area of less than 150 $mm^2$.

14. The ice scratcher of claim 13, comprising a wire form having a coil portion and a leg portion extending from the coil portion, the coil portion fixed to the snowmobile at a track frame portion.

15. An ice scratcher for a snowmobile, the snowmobile having a forward rearward axis, the ice scratcher comprising a single length of wire formed into a resilient wire form, the length of wire having a first end and an opposite second end, the form at the first end defining an anchor portion segment, the form having a coiled spring portion connecting to the anchor portion segment, the coiled spring portion comprising a plurality of coils and having a coiled spring portion axis, the plurality of coils including an innermost coil proximate the first end of the length of wire, and an outermost coil, the wire form further comprising a leg portion extending from the outermost coil, the leg portion having a proximal leg segment portion joining the outermost coil at a first juncture, the proximal leg segment portion joining a first mid leg segment portion at a second juncture, the first mid leg segment portion joining a second mid leg segment portion at a third juncture, the second mid leg segment portion joining a distal leg segment portion at a fourth juncture, the distal leg segment portion including the second end, wherein when the ice scratcher is mounted on a snowmobile track frame with the axis of the coiled spring portion extending laterally from the snowmobile track frame, the ice scratcher having an undeflected position with the leg portion extending downwardly, the leg portion configured such that, when viewed from an end of the snowmobile, has an expanded C-shape with the second mid leg segment portion being upright and being positioned as an outermost leg segment portion of the proximal leg segment portion, the first mid leg segment portion, the second mid leg segment portion, and the distal leg segment portion.

16. The ice scratcher of claim 15, wherein when the ice scratcher is mounted on the snowmobile, when viewed from the side looking at the axis of the coiled spring portion, the proximal leg segment portion is linearly aligned with the mid leg segment portion, the proximal leg segment portion and the mid leg segment portion extending downwardly and rearwardly from the coiled spring portion, the distal leg segment portion extends downwardly and forwardly from the third juncture.

17. The ice scratcher of claim 15, wherein the ice scratcher is securable to the track frame of the snowmobile by a mounting fixture that clamps the innermost coil between the mounting fixture and the snowmobile frame.

18. The ice scratcher of claim 15, wherein the distal leg segment portion has a flat surface, the flat surface facing upward, forward, and inward when the ice scratcher is attached to the snowmobile in the undeflected position.

19. The ice scratcher of claim 18, wherein the flat surface has a surface area of greater than 30 $mm^2$ and less than 150 $mm^2$.

20. The ice scratcher of claim 15, wherein the wire form has a nominal diameter between 3.75 and 5.75 mm.

* * * * *